(No Model.) 2 Sheets—Sheet 2.
W. A. CAMERON & W. J. DE LA MARE.
AUTOMATIC BRAKE FOR VEHICLES.
No. 548,799. Patented Oct. 29, 1895.
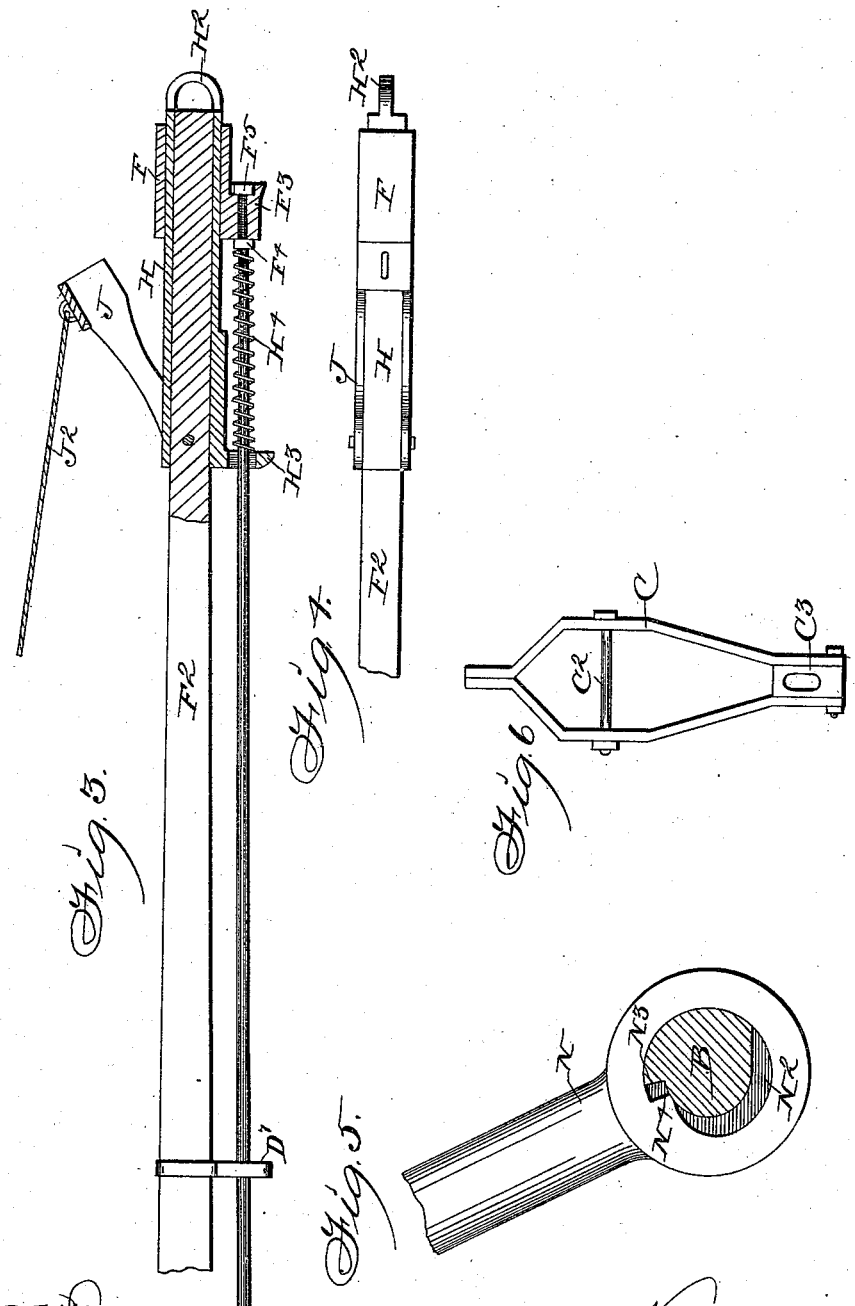

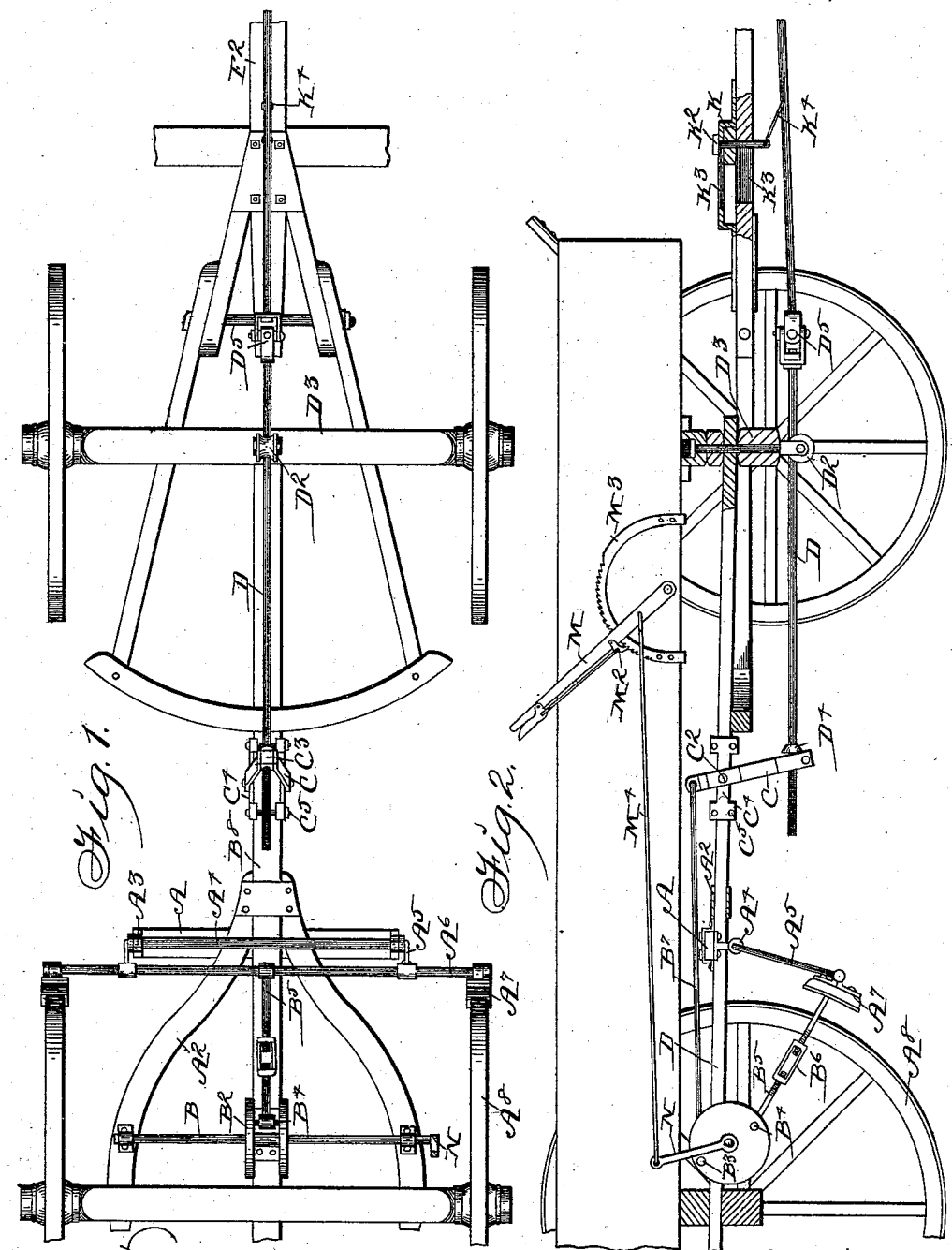

UNITED STATES PATENT OFFICE.

WILLIAM A. CAMERON AND WILLIAM J. DE LA MARE, OF DES MOINES, IOWA; SAID DE LA MARE ASSIGNOR TO SAID CAMERON.

AUTOMATIC BRAKE FOR VEHICLES.

SPECIFICATION forming part of Letters Patent No. 548,799, dated October 29, 1895.

Application filed February 11, 1895. Serial No. 538,046. (No model.)

*To all whom it may concern:*

Be it known that we, WILLIAM A. CAMERON and WILLIAM J. DE LA MARE, citizens of the United States, residing at Des Moines, in the county of Polk and State of Iowa, have invented a new and useful Automatic Brake for Vehicles, of which the following is a specification.

The object of this invention is to provide simple, cheap, and durable means adapted to be applied to a wagon or other vehicle for automatically applying a brake to the wheels when the draft-animals pull backwardly, in combination with and operating independently of a hand-brake that is adapted to be set or released by the driver, so that the brakes may be readily set and locked at all times by the driver, even though the draft-animals are pulling forwardly.

Our object is, further, to provide means whereby the automatic-brake device may be held inoperative, so that the wagon may be backed.

Our invention consists in the construction, arrangement, and combination of the various parts of the device with a wagon-brake, as hereinafter set forth, pointed out in our claims, and illustrated in the accompanying drawings, in which—

Figure 1 is an inverted plan view of the running-gear of a wagon having the device applied thereto. Fig. 2 is a vertical longitudinal sectional view of a wagon running-gear with the automatic wagon-brake device applied thereto, showing a wagon-box thereon and a hand-brake connected therewith. Fig. 3 shows the forward end of a wagon-tongue and the mechanism thereon for operating the brake device. Fig. 4 is a top view of the same. Figs. 5 and 6 are detail views of parts of the device hereinafter explained.

Referring to the accompanying drawings, the reference-letter A is used to indicate a cross-piece secured to the rear hounds $A^2$ of a wagon having the bearers $A^3$ at its ends and a hollow shaft $A^4$ mounted in said bearers; $A^5$, a rod passed through said shaft and having arms extended downwardly and rearwardly to support a bar $A^6$, having the brake-shoes $A^7$ on its ends adapted to be brought into engagement with the rear wheels $A^8$.

B indicates a shaft mounted in suitable bearings on the under side of the rear hounds and having the two mating disks $B^2$ fixed to its central portion. These disks are connected with each other at diametrically-opposite sides of their centers by the pins $B^3$ and $B^4$.

$B^5$ indicates a rod pivotally connected with the bar $A^6$ and to the pin $B^4$ and having a turnbuckle $B^6$ therein, whereby its length may be readily adjusted and the proximity of the brake-shoes to the wheels be changed, so that as wear of the shoes takes place the shoes may be brought closer to the wheels.

$B^7$ indicates a rod pivoted to the pin $B^3$ at one end extended forwardly above the reach $B^8$ of a wagon. It will be obvious that a forward pull upon said rod will apply the brake-shoes to the rear wheels.

C indicates a lever composed of two flat side pieces, separated at their central portions to admit the reach between them and pivoted thereto by means of the bolt $C^2$. Between the lower ends of the side pieces is secured a slotted block $C^3$, and the top of the lever is perforated to admit the forward end of the rod $B^7$.

$C^4$ indicates metal plates bolted to the opposite sides of the reach to protect the same from friction by the sides of said lever.

D indicates a rod, extended longitudinally beneath the wagon, supported by a pulley $D^2$, that is fixed to the forward axle $D^3$ and having its rear end inserted in said slotted block $C^3$. $D^4$ indicates a nut on the rear end portion of said rod in advance of the lever C to engage its lower end when the rod is moved rearwardly. $D^5$ indicates a universal joint of common construction in said rod beneath the pivoted point of the tongue, so that the tongue and rod may move in unison relative to the reach, and $D^7$ indicates bearers attached to the tongue to support the forward end of the rod.

F indicates an angular sleeve slidingly mounted on the outer end of the tongue $F^2$ and having a downwardly-projecting lug $F^3$ on its under surface provided with a longitudinal bore to admit the forward end of the rod D, which is firmly connected therewith by the nuts $F^4$ and $F^5$ on opposite sides of the lug.

H indicates a metal socket for the forward end of the tongue, having a loop H² at its forward end, to which a second team of horses may be attached, and H³ indicates a downwardly-projecting lug at the rear end of the socket, slotted to admit the rod D.

H⁴ indicates an extensile coil-spring placed upon the rod D, with its ends in engagement with the lug H³ and the lug F³, so as to normally hold said sliding sleeve F to its forward limit and prevent rattling.

J indicates a frame composed of two parallel side pieces that serve as pawls and a cross-piece at their upper ends. At their lower ends they are pivotally attached to the rear end of the socket H and adapted to be swung downwardly and have the cross-piece rest upon the top of the tongue and its ends engage the rear end of the sliding sleeve, and thus prevent a rear movement of said sleeve, and J² indicates a rope attached thereto, whereby said frame may be elevated. The neck-yoke center is placed on the tongue and overlaps the sliding sleeve and engages the lug F³ thereon, so that when the horses pull backwardly thereupon said sliding sleeve and the rod D will be forced backwardly.

K indicates the doubletree pivotally attached to the tongue, and K² the bolt for connecting it with the tongue. Said bolt is passed through slots K³ in the tongue and the guard for the doubletree, so that the said doubletree is capable of a slight movement longitudinally of the tongue. K⁴ indicates a link attached to the lower end of said bolt and to the rod D, so that as said rod moves rearwardly the doubletree will also be moved back and the singletree and traces of the harness be held comparatively taut at all times. It will now be obvious that a backward pull by the draft-animals will hold the brakes in firm engagement with the wheels, and that when the draft-animals are pulling forwardly the brake-shoes are free to drop away from the wheels by gravity or be held to the wheels by any suitable means.

M indicates a hand-lever pivotally mounted on the side of a wagon-box and having a spring-actuated pawl M² thereon adapted to engage a segmental rack M³, mounted on the side of the wagon. M⁴ indicates a rod pivoted to said lever and extended rearwardly to a crank N. This crank is mounted on the end of the shaft B. A recess N² is formed in said shaft having a shoulder N³, and N⁴ is a downward projection from said crank adapted to enter said recess, as clearly shown in Fig. 5. This, it will be seen, will permit the shaft to be moved freely a part of a revolution without operating the crank, and when said crank is moved forwardly far enough the square shoulders N³ and N⁴ will engage and the shaft will be moved to set the brakes. Thus the hand-brake may be operated when the brakes are already in engagement with the wheels to apply additional friction, or when the draft-animals are pulling forwardly.

The brakes may be set as in the ordinary manner, or the device at the end of the tongue may be raised and the draft-animals made to operate the brakes automatically. When it is desired to back the wagon, the said device on the end of the tongue is lowered and the sliding sleeve held inoperative.

Having thus described our invention, what we claim as new therein, and desire to secure by Letters Patent of the United States therefor, is—

1. In an automatic vehicle brake, the combination with a vehicle, suitable brake mechanism thereon, and a rod slidingly connected with the tongue for operating the brake mechanism when forced rearwardly, of a sleeve, slidingly mounted on the outer end of the tongue, a lug on its lower end connected with the rod, a spring for normally pressing the lug forwardly, a frame or pawl pivoted to the tongue to normally prevent a rearward movement of the sleeve, and means for manually elevating the frame or pawl, substantially as set forth.

2. In an automatic wagon brake the combination with a wagon, of a sleeve slidingly connected with the tongue, a rod attached to the sleeve, a spring for normally holding the rod to its forward limit, a universal joint in the rod, a bifurcated lever fulcrumed to the wagon and having a slot in its lower end to admit said rod, a nut adjustably mounted on the rod at the forward face of the lever, and suitable brake mechanism connected with the upper end of the lever, substantially as set forth.

3. In an automatic wagon brake, the combination with a wagon, of a sleeve slidingly connected with the tongue, a rod attached to the sleeve, a spring for normally holding the rod to its forward limit, a universal joint in the rod, a bifurcated lever fulcrumed to the wagon and having a slot in its lower end to admit said rod, a nut adjustably mounted on the rod at the forward face of the lever, a rod pivoted to the top of the lever, a shaft mounted on the wagon, a lever fixed to the shaft and connected with the rod, a brake shoe connected with said lever, a crank attached to said shaft and capable of a slight movement relative to the shaft, and means for manually operating said shaft, substantially as set forth.

WILLIAM A. CAMERON.
WILLIAM J. DE LA MARE.

Witnesses:
J. RALPH ORWIG,
THOMAS G. ORWIG.